United States Patent [19]
Omamyuda et al.

[11] Patent Number: 5,317,375
[45] Date of Patent: May 31, 1994

[54] OPTICAL DISTANCE MEASURING APPARATUS

[75] Inventors: Yukio Omamyuda, Sagamihara; Shigeru Kimura, Yokohama; Toru Tanabe, Machida; Kazuhisa Iwasaki, Yokohama; Takao Seto, Yokohama; Hideki Kitamura, Yokohama; Kazuhiko Sugimura, Yokohama; Yasushi Senoo, Yokohama, all of Japan

[73] Assignee: Stanley Electric Co., Ltd., Tokyo, Japan

[21] Appl. No.: 841,049

[22] Filed: Feb. 25, 1992

[30] Foreign Application Priority Data

Feb. 28, 1991 [JP] Japan .................. 3-017073
Feb. 28, 1991 [JP] Japan .................. 3-017074
Mar. 29, 1991 [JP] Japan .................. 3-028246

[51] Int. Cl.$^5$ .................................. G01C 3/08
[52] U.S. Cl. .................................. 356/5; 356/4
[58] Field of Search ............ 356/4, 5; 367/127; 342/122, 128

[56] References Cited

U.S. PATENT DOCUMENTS 4,699,508 10/1987 Bölkow et al. .................. 356/5
4,770,526 9/1988 Manhart et al. .................. 356/5
4,942,561 7/1990 Onishi et al. .................. 356/5 X

FOREIGN PATENT DOCUMENTS 0271188 5/1988 European Pat. Off. .
2200810 8/1988 United Kingdom .
2243511 10/1991 United Kingdom .

*Primary Examiner*—Mark Hellner
*Attorney, Agent, or Firm*—Frishauf, Holtz, Goodman & Woodward

[57] ABSTRACT

An optical distance measuring apparatus operable in accordance with an optical intensity modulating process to optically measure a distance between a driver's vehicle and a vehicle running ahead of his vehicle includes a light emitting portion serving as a light source to emit a distance measuring light beam, an optical lens system, a light receiving portion for receiving a reflected light reflected from the vehicle running ahead of the driver's vehicle through the optical lens system, and a processing system for correcting phase delay between the distance measuring light beam and the reflected light beam utilizing reference light beams emitted from a plurality of reference light sources to determine the distance. A processing system for determining the distance based on a time difference between the time when the distance measuring light beam is emitted from the light emitting portion and the time when the reflected light beam is received by the light receiving portion may be substituted for the processing system for the correcting phase delay between the distance measuring light beam and the reflected light beam. In addition, the system includes an apparatus for mounting on a vehicle body optical distance measuring apparatuses, each operable as a light emitting/receiving portion.

11 Claims, 5 Drawing Sheets

OPTICAL DISTANCE MEASURING APPARATUS

BACKGROUND OF THE INVENTION

1. Field of the Invention

The present invention relates generally to an optical distance measuring apparatus employable for a movable type distance measuring system. More particularly, the present invention relates to an optical distance measuring apparatus of the foregoing type operable in conformity with an optical intensity modulating process. Further, the present invention relates to an apparatus for mounting on a vehicle body optical distance measuring apparatuses each having a light emitting/receiving portion operable in accordance with an optical intensity modulating process.

2. Description of the Related Art

To facilitate understanding of the present invention, two typical conventional optical distance measuring apparatuses will briefly be described below with reference to FIG. 1 and FIG. 2.

FIG. 1 is an illustrative view of a conventional two-eyed type optical distance measuring apparatus which schematically shows the structure of the apparatus. As shown in the drawing, the apparatus includes a lens 1 for emitting a modulated light beam from a light source 6 and a lens 2 for receiving a light beam reflected from a corner cube 3 placed on a measuring point, and both the lenses 1 and 2 are accommodated in a housing 4.

Next, FIG. 2 is an illustrative view of a conventional one-eyed type optical distance measuring apparatus which schematically shows the structure of the apparatus. This apparatus is constructed such that a light beam modulated for the purpose of measuring a distance is emitted from a light source 6 through a prism 10 and a light emitting/receiving lens 9 and a light reflected from a corner cube 3 placed on a measuring point is received by a light receiving element 7 via the light emitting/receiving lens 9 and the prism 10, and these components are accommodated in a housing 4 of the apparatus.

Although illustration is neglected, each of the conventional optical distance measuring apparatuses shown in FIG. 1 and FIG. 2 is provided with a mechanism for changing a light passage for a reference light beam serving as a reference to a light passage for a distance measuring light beam and vice versa, and moreover, a mechanism for equalizing a quantity of the reference light beam to a quantity of the measuring light.

A common problem to the conventional optical distance measuring apparatuses shown in FIG. 1 and FIG. 2 is that a distance measuring operation is restrictively performed only within the range of 1 to 2 km. In recent years, however, earnest requests have been raised from users for providing an optical distance measuring apparatus which assures that a longer distance ranging from 5 to 10 km can be measured reliably. To satisfy these requests, it is necessary that an output from the light source 6 is substantially enlarged.

Another common problem to the conventional optical distance measuring apparatuses is that when an output from the light source 6 is enlarged, a slight quantity of reflected light is received by the light receiving element 7 as a stray light via the lens surfaces and a reference light passage 5 arranged in the housing 4, resulting in each measured value being erroneously processed.

Another common problem to the conventional optical distance measuring apparatuses is that since the housing of each conventional apparatus is provided with a movable portion, the housing is susceptible to a series of vibrations, causing each measured value to be erroneously displayed on the screen of a displaying portion.

An additional common problem to the conventional optical measuring apparatuses is the fact that each optical distance measuring apparatus and head lamps are separately fabricated and they are then arranged at different locations on a vehicle body, resulting in a complicated mounting arrangement.

Further, optical axes of the head lamps and an optical axis of the optical distance measuring apparatus are separately adjusted only by performing time-consuming and complicated operations.

Since the head lamps and the optical distance measuring apparatus are separately designed and constructed, and moreover, they are separately fabricated as mentioned above, there arises a problem that it is difficult to design them based on a common technical concept.

Moreover, since infrared rays are utilized to operate the optical distance measuring apparatus, an additional problem is that it is troublesome and time-consuming to properly adjust the optical axis of each optical distance measuring apparatus after it is mounted together with head lamps on the vehicle body.

SUMMARY OF THE INVENTION

The present invention has been made with the foregoing background in mind.

An object of the present invention is to provide an optical distance measuring apparatus operable in accordance with an optical intensity modulating process which assures that a distance between two locations, e.g., a distance from a driver's vehicle to a vehicle running ahead of his vehicle can be measured with high accuracy.

Another object of the present invention is to provide an optical distance measuring apparatus operable in accordance with an optical intensity modulating process which assures that no item is visually recognized on the screen of a displaying portion in a processing system when an object to be measured is not present within the range where a distance can not be measured with the apparatus.

Another object of the present invention is to provide an optical distance apparatus operable in accordance with an optical modulating process which makes it possible to prevent unnecessary data derived from a noise, a light emitted from other approaching vehicle or the like from being erroneously displayed on the screen of a display portion in a processing system.

Still another object of the present invention is to provide an optical distance measuring apparatus operable in accordance with an optical intensity modulating process which makes it possible that a driver can easily determine with his eyes based on an item displayed on the screen of a displaying portion in a processing system whether or not he can optically recognize a vehicle running ahead of his vehicle.

Still another object of the present invention is to provide an apparatus for mounting on a vehicle body optical distance measuring apparatuses each having a light emitting/receiving portion operable in accordance with an optical intensity modulating process.

According to one aspect of the present invention, there is provided an optical distance measuring apparatus operable in accordance with an optical intensity modulating process, wherein the apparatus comprises a light emitting portion serving as a light source to emit a distance measuring light beam, an optical lens system for allowing the distance measuring light beam to be oriented toward an object to be measured from which the distance measuring light beam is reflected in the form of a reflected light beam, a light receiving portion for receiving a reflected light beam reflected from the object to be measured through the optical lens system, a plurality of reference light sources each arranged in optical association with the light receiving portion to generate a reference light beam, and a processing system for properly correcting phase delay between the distance measuring light beam and the reflected light beam using the reference light beams so as to determine a distance.

The processing system includes an emitting light generating circuit, a received light processing circuit and a calculating circuit as essential components.

Specifically, the emitting light generating circuit includes a reference oscillator and a driving circuit for driving the light emitting portion and the reference light sources in response to an output from the reference oscillator. In addition, the received light processing circuit includes an amplifier for amplifying a signal derived from photoelectrical conversion of the received light beam in the light receiving portion and a filter in which unnecessary signals are removed so as to allow the amplified signal to be introduced into the calculating circuit. Additionally, the calculating circuit includes a local oscillator, a mixer and a calculator for calculating the number of signals outputted from the mixer so as to determine a distance from the object to be measured while a phase difference between the distance measuring light beam and the reflected light beam is properly corrected, wherein an output from the reference oscillator, an output from the local oscillator and the amplified signal derived from the reflected light beam are introduced into the calculator.

According to other aspect of the present invention, there is provided an optical distance measuring apparatus operable in accordance with an optical light intensity modulating process, wherein the apparatus comprises a light emitting portion serving as a light source to emit a distance measuring light beam, an optical lens system for allowing the distance measuring light beam to be oriented toward an object to be measured from which the distance measuring light beam is reflected in the form of a reflected light beam, a light receiving portion for receiving a reflected light beam reflected from the object to be measured through the optical lens system, and a processing system for determining a distance from the object to be measured based on time difference between the time when the distance measuring light beam is emitted from the light emitting portion and the time when the reflected light beam is received by the light receiving portion.

The processing system includes a displaying portion for displaying on the screen thereof the result derived from determination made by the processing system, a controller and a mixer as essential components. In addition, the apparatus further includes a driver for driving the light emitting portion and an amplifier for amplifying a signal derived from the reflected light beam via photoelectrical conversion.

Specifically, the driver is activated in response to an output from the mixer, and an output from the amplifier is inputted into the mixer. Additionally, the controller performs a controlling operation such that a certain item representing a distance is visually recognized on the screen of the display portion only when the object to be measured is present within the range where the distance can be measured with the apparatus.

According to another aspect of the present invention, there is provided an apparatus for mounting optical distance measuring apparatuses each operable in accordance with an optical intensity modulating process on a vehicle body, wherein the apparatus comprises an opposing pair of head lights mounted at the fore end part of the vehicle body, housings for receiving the head lights each comprising a high beam light and a low beam light, and light emitting/receiving portions each arranged in the housing to serve as an optical distance measuring apparatus operable in accordance with an optical intensity modulating process.

It is inevitably essential that optical axes of the light emitting/receiving portions coincide with optical axes of the head lights. In addition, at least one of the head lamps may be provided with a light emitting/receiving portion to serve as an optical distance measuring apparatus operable in accordance with an optical intensity modulating process.

Other objects, features and advantages of the present invention will become apparent from reading of the following description which has been made in conjunction with the accompanying drawings.

BRIEF DESCRIPTION OF THE DRAWINGS

The present invention is illustrated in the following drawings in which.

DESCRIPTION OF THE PREFERRED EMBODIMENTS

Now, the present invention will be described in detail hereinafter with reference to the accompanying drawings which illustrate preferred embodiments of the present invention.

Generally, a process of optically measuring a certain length or a certain distance is usually classified into three processes, one of them being a light wave interference process wherein the wavelength of a light beam is taken as a reference representing a length, another one being an optical intensity modulating process wherein a light beam having a constant intensity is converted into a strong/weak light beam by employing certain means or the wavelength of a light beam which is determined dependent on the modulated frequency of the light beam specific to a light source adapted to output a strong/weak light beam is taken as a reference and another one being a process wherein a long distance is measured by utilizing the speed of a light beam.

It should be noted that the optical intensity modulating process is employed to carry out the present invention In other words, an optical distance measuring apparatus, to which the present invention is applied, is adapted to operate in conformity with the optical intensity modulating process.

The optical intensity modulating process is practiced such that a certain distance is measured by measuring a phase difference between a reference light and a light reflected from an object to be measured while selectively utilizing a single or a plurality of modulated light beams depending on a distance to be measured and a resolution of the optical distance measuring apparatus wherein the wavelength of each light beam which is determined depending on a modulated frequency is taken as a reference.

Now, an optical distance measuring apparatus according to a first embodiment of the present invention will be described below with reference to FIG. 3 and FIG. 4.

Figure 1:
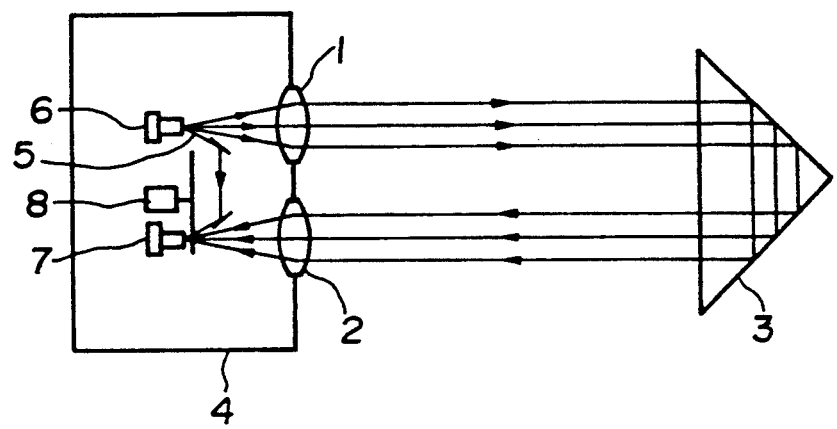
FIG. 1 is an illustrative view of a conventional two-eyed type optical distance measuring apparatus which schematically shows the structure of the apparatus.
Figure 4:
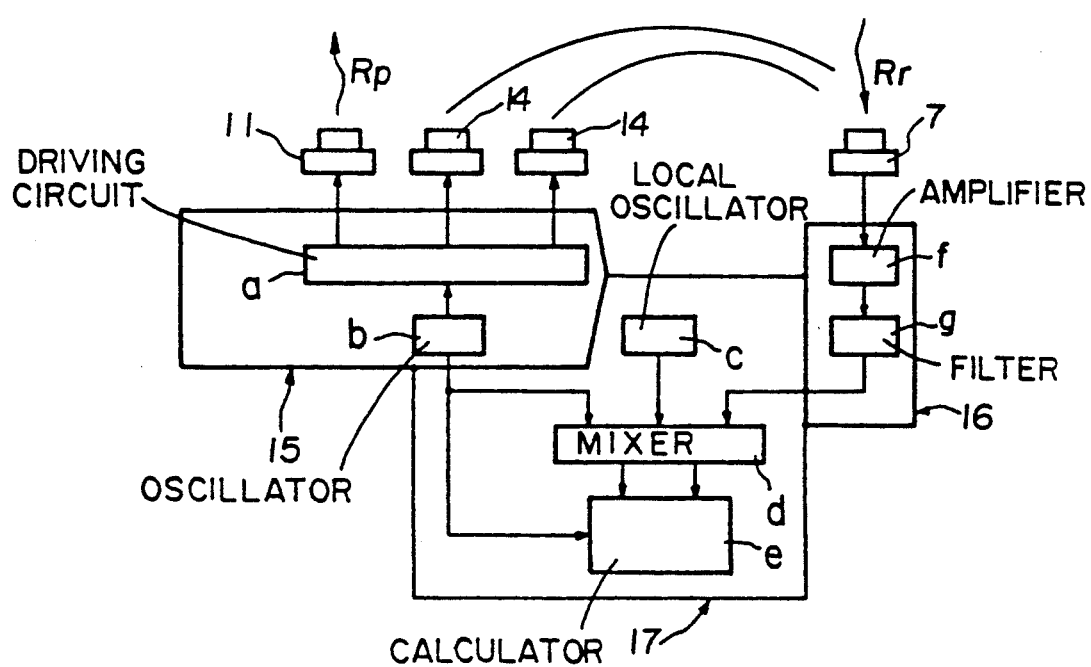
FIG. 4 is a block diagram of a processing system employable for the apparatus shown in FIG. 3.

Referring to FIG. 4 similar to FIG. 1 which illustrates a two-eyed type optical distance measuring apparatus, the same components as those shown in FIG. 1 are represented by same reference numerals. As is apparent from the drawing, a prism 3 is placed on a measurement location and exhibits a cubic configuration of which sharp corners are removed therefrom. To assure that an incident light beam and a reflected light beam are transmitted in parallel with each other, the prism 3 is usually made of a block glass. Thus, the reflected light beam returns to a housing 4 of the apparatus without fail even though the prism 3 is placed slightly incorrectly in respect of its orientation.

Since the apparatus has a round trip light passage comprising a forward light passage and a return light passage, an optical phase is varied by an angular distance of 360° at a distance equal to a half of the wavelength. Thus, in a normal case where a distance measuring light beam has a modulated frequency of 15 MHz and a wavelength of 20 m, a distance of 10 m corresponds to an optical phase of 360°.

When the apparatus is intended to obtain a resolution of 1 mm, a period is represented by 1 sec/15 MHz which is substantially equal to 6 ns. In addition, since 1 mm/10 m is represented by $10^{-4}$, it is required from the viewpoint of a time that the apparatus has a resolution of 67 ns $\times$ $10^{-4}$ which is equal to 6.7 ps.

In practice, it is very difficult to directly measure the resolution of the apparatus. For this reason, the present frequency is usually converted to a lower frequency so as to allow an optical phase to be measured with the lower frequency.

Since a measuring operation is performed within a very short period of time, there arises a problem that time delay appears in an electrical system. Although a round trip time of each distance measuring light beam is measured with a picosecond as a unit, the time delay of a light emitting/receiving element itself is measured with a nanosecond as a unit, and moreover, the time delay of other electronic components is measured with a substantially same time unit. Thus, a round trip time of the distance measuring light beam is not measured but a time delay of the electronic component is unavoidably measured with the apparatus of the present invention.

To avoid the foregoing problem, according to the present invention, a reference light passage is arranged in a housing of the apparatus so as to determine a distance based on a difference between the result derived from distance measurement in the reference light passage and the result derived from distance measurement in the distance measuring light passage.

When it is assumed that $\tau m$ designates a time required so as to allow a light beam to reciprocably pass through the distance measuring light passage, $\tau r$ designates a time required so as to allow a light beam to pass through the reference light passage and $\tau$ designates a delay time in the electric system, items which can practically be measured are two items, i.e., $Tm = \tau m + \tau$ and $Tr = \tau r + \tau$ and a time T corresponding to a length of the distance measuring light passage can be measured regardless of time delay in the electrical system in accordance with the following equation.

$$T = Tm - Tr = (\tau m + \tau) - (\tau r + \tau) = \tau m - \tau r$$

The distance measurement has been described above based on a time as a unit for the purpose of convenience. In practice, phase measurement is carried out with the same effect as that in the preceding case.

Referring to FIG. 3 again, the apparatus includes a light emitting mirror sleeve 12 in which a light emitting lens 1 is disposed, and a light source 11 such as a light emitting diode, a laser light diode or the like operable for the purpose of measuring a distance is disposed at the focus located on the optical axis of the light emitting lens 1.

When distance measurement is practically carried out, the light source 11 is activated with the aid of an emitting light generating circuit 15 to generate a light beam modulated corresponding to a required optical intensity, and the thus modulated light beam is emitted toward a measuring point in the form of a distance measurement light beam Rp.

A prism 3 or a similar reflective member is placed at the measuring point and a light receiving lens 2 receives a reflected light beam Rr. Subsequently, the received light beam Rr is collected by a light receiving element 7 disposed at the focus located on the optical axis of the light receiving lens 2. When reference is to be made, one of reference light sources 14 is activated with the aid of the emitting light generating circuit 15 to emit a reference light beam toward the light receiving element 7 while modulating an optical intensity of the reference light beam.

Not only when a distance is to be measured but also when reference is to be made, the received light beam is converted by the light receiving element 7 in which the converted light beam is inputted into a received light processing circuit 16 to detect an optical phase.

Figure 2:
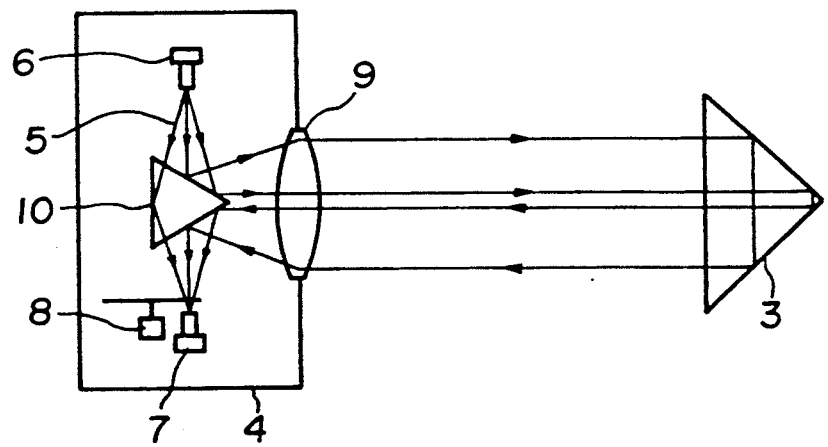
FIG. 2 is an illustrative view of a conventional one-eyed type optical distance measuring apparatus which schematically shows the structure of the apparatus.

A plurality of reference light sources 14 are arranged outside of a light receiving mirror sleeve 13 independently of the light source 11 so as to electrically generate a reference light beam. Conventionally, a part of the distance measuring light beam Rp has been introduced into the light receiving element 7 as a stray light via a reference light passage 5 as described above with reference to FIG. 1 and FIG. 2, resulting in a measuring accuracy being degraded. In contrast with the conventional optical distance measuring apparatus, the optical distance measuring apparatus of the present invention can prevent the measuring accuracy from being degraded, by arrangement of a plurality of reference light sources 14 and the emitting light generating circuit 15 in the above-described manner.

It is desirable that the distance measuring light source 11 and the reference light sources 14 have not only the same phase characteristics but also the same driving conditions (e.g., a condition for preventing an occurrence of phase error attributable to an electric current for activating a circuit 17, an electric current for activating a light emitting element for the light source 11 and an electric current for activating a driving transistor). The driving conditions may be varied within the allowable range of a measuring accuracy.

It is not required that all the reference light sources 14 are simultaneously activated but it is recommended that some of them or all of them are activated by changing the number of light emitting elements for electrically generating a light beam or changing the combination among the light emitting elements corresponding to an optical quantity of the reflected light beam Rr.

This is because a quantity of light beam to be emitted from the reference light sources 14 to the light receiving element 7 varies corresponding to changing of an extent of amplification of an amplifier for amplifying an output from the light receiving element 7.

With respect to the conventional optical distance measuring apparatus as described above with reference to FIGS. 1 and 2, an optical quantity of the reference light beam and an optical quantity of the reflected light beam Rr are mechanically equalized to each other with the aid of an iris or the like so as to allow an optical quantity of the reflected light beam Rr to be equalized with an optical quantity of the reference light beam. In other words, phase characteristics of the amplifier for amplifying an output from the light receiving element 7 vary depending on a magnitude of the output from the light receiving element 7. In contrast with the conventional optical distance measuring apparatus, with the optical distance measuring apparatus of the present invention, it is not required to equalize an optical quantity of the reflected light beam Rr to an optical quantity of the reference light beam.

With such construction, the optical distance measuring apparatus of the present invention can practically be used within the range where the phase characteristics do not vary no matter how a magnitude of an input signal varies on the assumption of arrangement of an amplifier having excellent phase characteristics. In other words, a distance can be measured merely by employing a plurality of reference light sources 14 without any necessity for equalizing an optical quantity of the reference light to an optical quantity of the reflected light beam Rr with the aid of an iris or the like.

In the shown embodiment, the reference light sources 14 are arranged adjacent to the light receiving mirror sleeve 13. Alternatively, they may be arranged outside of the light receiving mirror sleeve 13. In this case, a reference light beam is introduced into the light receiving mirror sleeve 13 via an optical fiber.

Figure 3:
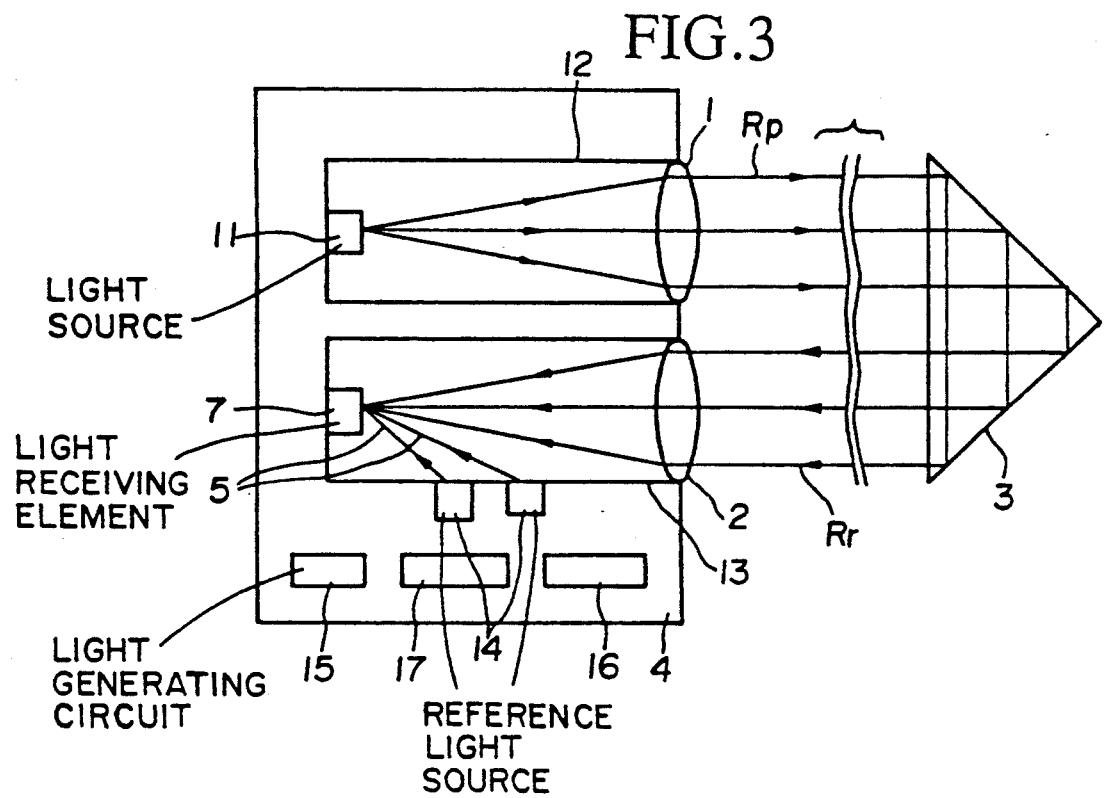
FIG. 3 is an illustrative view of a two-eyed type optical distance measuring apparatus according to a first embodiment of the present invention which schematically shows the structure of the apparatus.

FIG. 4 is a block diagram which schematically illustrates the structure of a processing system employable for the optical distance measuring apparatus shown in FIG. 3.

The processing system includes a reference oscillator b the output of which is inputted into a driving circuit a which in turn drives the distance measuring light source 11 and the reference light sources 14 with the same frequency as that of the reference oscillator b.

With this construction, a reference light beam of which brightness varies with the same frequency as that of the reference oscillator b is emitted from each of the reference light sources 14.

The reference light beam is received by the light receiving element 7 in which it is photoelectrically converted into a signal which in turn is amplified in an amplifier f, and subsequently, the amplified signal is inputted into a mixer d while unnecessary signals are removed therefrom in a filter g.

In addition, an output from the reference oscillator b and an output from a local oscillator c are also inputted into the mixer d which in turn performs a frequency converting operation in response to the aforementioned outputs.

Here, it is important that a phase relationship between an output from the reference oscillator b and an output from the amplifier f correctly corresponds to a phase relationship among a series of signals which have been subjected to frequency conversion in the mixer d.

Consequently, a distance can be detected by counting the number of signals representing outputs from the mixer d with the aid of a calculator e which correctly determines a phase difference between the distance measuring light beam and the reflected light beam. In other words, the calculator e calculates the distance by counting the number of signals outputted from the mixer d.

It should be noted that each reference light beam has been described above but things are entirely the same with respect to a distance measuring light beam.

Next, an optical distance measuring apparatus according to a second embodiment of the present invention will be described below with reference to FIG. 5 to FIG. 8.

Figure 5:
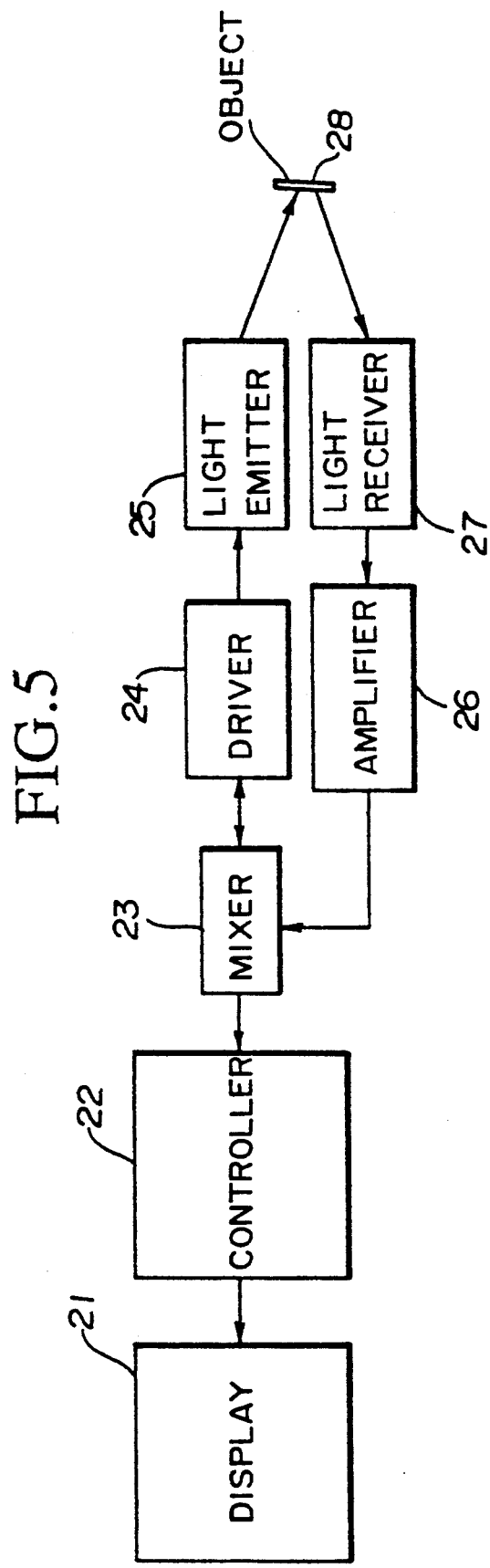
FIG. 5 is a block diagram which schematically illustrates the structure of an optical distance measuring apparatus according to another embodiment of the present invention.

FIG. 5 is a block diagram which schematically illustrates the structure of a processing system employed for the optical distance measuring apparatus. The processing system includes a display portion 21, a controller 22 and a digital type mixer 23 which are successively electrically connected to each other. In addition, the system includes a light emitting portion 25 on the driver 24 side and a light receiving portion 27 on the amplifier 26 side.

A light beam emitted from the light emitting portion 25 is reflected at an object 28 to be measured and the reflected light beam is then received by the light receiving portion 27. With this construction, a distance between a driver's vehicle and a vehicle running ahead of his vehicle is measured based on a time difference between the time when a light beam is emitted from the light emitting portion 25 and the time when it is received by the light receiving portion 27 via reflection at the object 28.

When the following inequality is established, any display is not visually recognized on the screen of the display portion 21 with the driver's eyes.

$$(Xmax - Xmin) > 0.5 \text{ m}$$

Next, when the following inequality is established, a display of $\overline{X}$ is visually recognized on the screen of the display portion 21 with his eyes.

$$(Xmax - Xmin) \leq 0.5 \text{ m}$$

Figure 7:
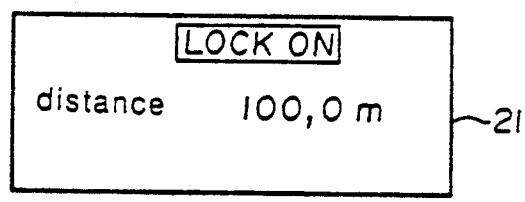
FIG. 7 is a front view which shows the screen of a displaying portion in a processing system of the apparatus shown in FIG. 5 when a certain item is visually recognized thereon.
Figure 8:
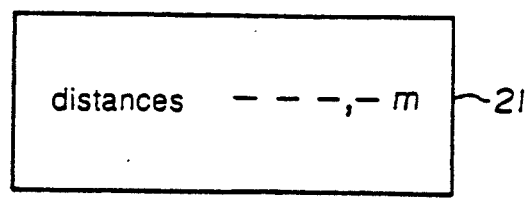
FIG. 8 is a front view similar to FIG. 7, particularly illustrating that no item is visually recognized on the screen of the displaying portion.

The presence of a certain item on the screen of the display portion 21 is visually recognized as illustrated in FIG. 7, while the absence of any item on the screen of the display portion 21 is visually recognized as illustrated in FIG. 8.

Specifically, the controller 22 performs a controlling operation in the following manner. a) A display representing a certain distance is visually recognized only when an object to be measured is present within the range where the distance can be measured with the apparatus. b) First, a maximum value and a minimum value among data representing the results derived from measurements conducted within a predetermined continuous period of time are memorized in the controller 22 which in turn compares a difference between the maximum value and the minimum value with a specified value. When it is found that the foregoing difference exceeds the specified value, the controller 22 cancels the data memorized therein, and when it is found that it is less than the specified value, the controller 22 determines that the data are valid. With this construction, an occurrence of erroneous detection can be prevented with the apparatus. c) In the case as mentioned in the preceding paragraph b), when the controller 22 cancels the data on the distance measured at the present time, it unchangeably maintains the valid data on the distance measured at the preceding time or displays them on the screen of the display portion 21 for a predetermined period of time. d) While the controller 22 is sampling the valid data, characters representing the sampling state are displayed on the screen of the display portion 21. Alternatively, a lamp or a buzzer representing the sampling state may be activated by the controller 22. When it is found that the apparatus is kept in the state as represented in the preceding paragraph c), the controller 22 operates so as to allow the apparatus to be turned off.

Figure 6:
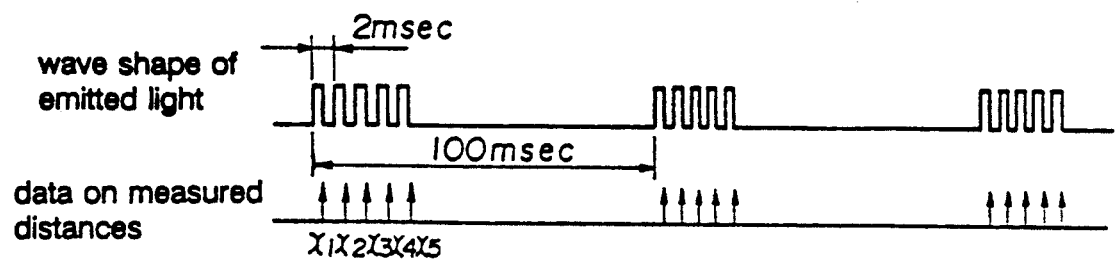
FIG. 6 is a timing chart which illustrates a mode of operation of the apparatus shown in FIG. 5.

For example, as shown in FIG. 6, when a vehicle running ahead of a driver's vehicle remains within the range where a distance can be measured with the apparatus, and at this time, the apparatus performs a measuring operation in accordance with a pattern that measurements are conducted five times for 2 msec and measurement is then interrupted for 90 msec, this represents a case where a speed of the driver's vehicle relative to the vehicle running ahead of his vehicle is 100 km/h. In this case, the distance by which the vehicle has run while measurements are conducted five times (for 10 msec) amounts to about 28 cm.

Thus, in a case where the difference X between a maximum value and a minimum value among data derived from measurements conducted five times is less than, e.g., 50 cm, an average value X among the data derived from the measurements conducted five times is displayed on the screen of the display portion 21 (see FIG. 7).

In a case where the average value X is more than 50 cm, the controller 22 determines that any vehicle running ahead of his vehicle is absent within the range where a distance can be measured with the apparatus. In this case, no distance display is visually recognized on the screen of the display portion 21 (see FIG. 8).

In this case, the controller 22 may completely cancel the display on the screen of the display portion 21. Otherwise, the controller 22 may hold the data derived from the measurements conducted at the preceding time or hold them only within a predetermined period of time.

In addition, characters representing that the apparatus is measuring a vehicle running ahead of a driver's vehicle, e.g., LOCK ON may be displayed on the screen of the display portion 21. Otherwise, a lamp representing that the apparatus is measuring a vehicle ahead of his vehicle may periodically be turned on and off. In this manner, a driver can easily visually discriminate based on the displayed value on the screen of the display portion 21 whether or not the apparatus has captured the vehicle running ahead of his vehicle.

The present invention has been described above with respect to the two-eyed type optical distance measuring apparatus. However, the present invention should not be limited only to this type. Alternatively, the present invention may equally be applied to an one-eyed type optical distance measuring apparatus.

Figure 9:
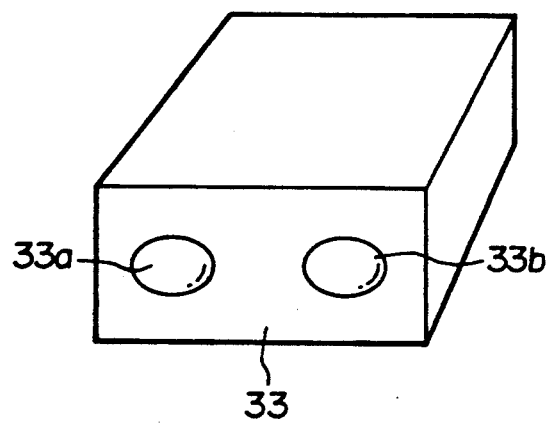
FIG. 9 is a fragmentary perspective view of an apparatus for mounting on a vehicle body optical distance measuring apparatuses each prepared in the form of a light emitting/receiving portion according to another embodiment of the present invention.
Figure 10:
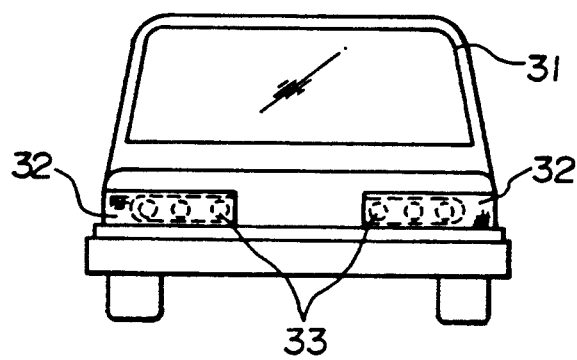
FIG. 10 is a front view of the vehicle body on which the light emitting/receiving portions shown in FIG. 9 are mounted.
Figure 11:
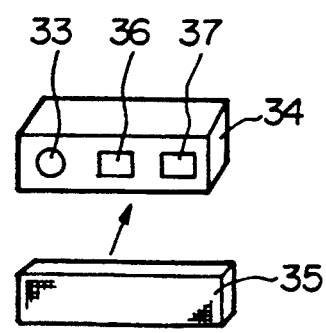
FIG. 11 is a perspective view which shows a head light housing and an outer lens cover for the apparatus in a disassembled state.

Next, an apparatus for mounting on a vehicle body optical distance measuring apparatuses each prepared in the form of a light emitting/receiving portion according to another embodiment of the present invention will be described below with reference to FIG. 9 to FIG. 11.

Head lights 32 are mounted on the fore end part of a vehicle body 31, and a high beam lamp 36, a low beam lamp 37 and a light emitting/receiving portion 33 are accommodated in a housing 34 of each head light 32.

A light emitting portion and a light receiving portion (not shown) constituting the optical distance measuring apparatus as described above with reference to FIG. 3 to FIG. 8 are incorporated in the light emitting/receiving portion 33, and a light emitting lens 33a and a light receiving lens 33b are arranged on the light emitting/receiving portion 33 at the positions corresponding to the light emitting portion and the light receiving portion.

In addition, an outer lens cover 35 common to the head lamp 32 and the light emitting/receiving portion 33 is arranged opposite to the head lamp housing 34.

It should be noted that each housing 34 for the head light 32 and the light emitting/receiving portion 33 may integrally be secured to the vehicle body 31 with the aid of stationary stays (not shown) while the head light 32 and the light emitting/receiving portion 33 are designed in accordance with standardized rules.

An optical axis of the light emitting/receiving portion 33 is properly adjusted so as to correctly coincide with optical axes of the head lamps 36 and 37. Specifically, while the lamps 36 and 37 on each head light 32 are arranged at the normal aiming positions, preliminary adjustment is first made so as to allow the light emitting/receiving portion 33 to assume an ideal aiming state. After the head light 32 is mounted on the vehicle body 31, an aiming operation is performed for the optical axes of the lamps 36 and 37 without any necessity for performing an aiming operation for the light emitting-/receiving portion 33.

Alternatively, an aiming operation may be performed separately for the lamps 36 and 37 and the light emitting/receiving portion 33 so as to allow the optical axes of the lamps 36 and 37 to coincide with the optical axis of the light emitting/receiving portion 33.

It should be added that the light emitting/receiving portion 33 may be arranged only for one of the left-hand and right-hand head lamps 32.

Since the optical distance measuring apparatus is constructed in the above-described manner, the following advantageous effects are obtainable.

The light passage for a distance measuring light beam is changed to the light passage for a reference light beam and vice versa by actuating certain electrical means. This arrangement assures that only a part of the distance measuring light beam is not received by the light receiving portion via the reference light passage no matter how an optical output from the light source is increased. In other words, there is no possibility that a measuring accuracy is degraded no matter how an optical output from the light source is increased so as to elevate a capability of measuring a distance.

In addition, since there is no need of arranging a mechanical mechanism for changing the light passage for a distance measuring light beam to the light passage for a reference light passage and vice versa, the optical distance measuring apparatus can satisfactorily resist against a series of vibrations.

When an object to be measured is not present within the range where a distance can be measured with the apparatus, any kind of display is not visually recognized on the screen of the displaying portion with the driver's eyes. Thus, a distance between an object to be measured and a driver's vehicle can visually be recognized with high accuracy, provided that it can be measured with the apparatus. In this case, display on the screen of the displaying portion may be canceled. Otherwise, data derived from measurements conducted at the preceding time may be held only for a predetermined period of time.

Additionally, it is possible to prevent an occurrence of erroneous display due to unnecessary factors such as a noise, a bright light beam emitted from an approaching vehicle or the like.

Whether a distance from a vehicle running ahead of a driver's vehicle is measured or not can visually be recognized by using characters or periodically turning on and off a lamp. Thus, a driver can easily visually discriminate with his eyes based on items on the screen of the display portion whether the optical distance measuring apparatus has captured the vehicle running ahead of his vehicle or not.

Further, since the apparatus for mounting on a vehicle body optical distance measuring apparatuses each prepared in the form of a light emitting/reflecting portion operable in accordance with an optical intensity modulating process is constructed in the above-described manner, the following advantageous effects are obtainable.

The light emitting/receiving portion serving as an optical distance measuring apparatus is incorporated in the same housing as a head light housing having head lamps mounted thereon. Thus, the light emitting-/receiving portion and the head lamps can easily be designed in accordance with standardized rules.

Since infrared rays are usually used for the light emitting/receiving portion (optical distance measuring apparatus), it is very difficult to properly adjust its optical axis with the conventional apparatus. However, since the light emitting/receiving portion is integrally incorporated in the head light housing while an optical axis of the light emitting/receiving portion coincides with optical axes of the head lamps, the optical axis of the light emitting/receiving portion can properly be adjusted merely by adjusting the optical axes of the head lamps.

Another advantageous effect is that a mounting operation can easily be performed for the head lamps and associated components since the light emitting/receiving portion is integrally secured to the head light housing.

While the present invention has been described above with respect to a few preferred embodiments thereof, it should of course be understood that the present invention should not be limited only to these embodiments but various changes or modifications may be made without any departure from the scope of the present invention as defined by the appended claims.

What is claimed is:

1. An optical distance measuring apparatus operable, comprising:
   a light emitting means for emitting a distance measuring light beam,
   an optical lens system including means for orienting said distance measuring light beam toward an object to be measured, said distance measuring light beam being reflected from said object in the form of a reflected light beam,
   light receiving means for receiving a reflected light beam reflected from said object to be measured through said optical lens system,
   a plurality of reference light source means, each arranged in optical association with said light receiving means for generating a reference light beam, and
   processing means for correcting a phase delay between said distance measuring light beam and said received reflected light beam using said reference light beams so as to determine a distance, said processing means including a display portion having a screen, and
   control means for performing a controlling operation such that a certain item representing a distance is visually recognized on the screen of said display portion only when said object to be measured is present within a range where said distance can be measured with said apparatus.

2. The optical distance measuring apparatus as claimed in claim 1, wherein said processing means comprises an emitting light generating circuit, a received light processing circuit and a calculating circuit coupled to said emitting light generating circuit and to said received light processing circuit.

3. The optical distance measuring apparatus as claimed in claim 2, wherein said emitting light generating circuit includes:
   a reference oscillator, and
   driving circuit means for driving said light emitting means portion and said reference light source means sources in response to an output from said reference oscillator.

4. The optical distance measuring apparatus as claimed in claim 3, wherein said received light processing circuit includes:
- amplifier means for amplifying a signal derived from photoelectrical conversion of said received reflected light beam in said light receiving means, and
- filter means coupled to an output of said amplifier for removing unnecessary signals so as to allow the amplified signal, with said unnecessary signals removed therefrom, to be introduced into said calculating circuit.

5. The optical distance measuring apparatus as claimed in claim 4, wherein said calculating circuit includes:
- a local oscillator,
- a mixer, and
- calculator means for calculating a number of signals outputted from said mixer so as to determine a distance from said object to be measured while a phase difference between said distance measuring light beam and said received reflected light beam is corrected,
- an output from said reference oscillator, an output from said local oscillator and the amplified signal derived from said received reflected light beam being introduced into said calculator means.

6. An optical distance measuring apparatus, comprising:
- light emitting means for emitting a distance measuring light beam,
- an optical lens system including means for orienting said distance measuring light beam toward an object to be measured, said distance measuring light beam being reflected from said object in the form of a reflected light beam,
- light receiving means for receiving a reflected light beam reflected from said object to be measured through said optical lens system, and
- processing means for determining a distance from said object to be measured based on a time difference between a time when said distance measuring light beam is emitted from said light emitting means and a time when said reflected light beam is received by said light receiving means, said processing means including a display portion having a screen, and
- control means for performing a controlling operation such that a certain item representing a distance is visually recognized on the screen of said display portion only when said object to be measured is present within a range where said distance can be measured with said apparatus.

7. The optical distance measuring apparatus as claimed in claim 6, wherein said processing means comprises a controller and a mixer.

8. The optical distance measuring apparatus as claimed in claim 7 further including:
- driver means for driving said light emitting means,
- means responsive to said received reflected light for deriving an electrical signal therefrom; and
- amplifier means for amplifying an electrical signal derived from said reflected light beam via photoelectrical conversion.

9. The optical distance measuring apparatus as claimed in claim 8, wherein:
- said driver means is activated in response to an output from said mixer, and
- an output from said amplifier means is inputted into said mixer.

10. The optical distance measuring apparatus as claimed in claim 3, wherein said received light processing circuit includes:
- amplifier means for amplifying a signal derived from photoelectrical conversion of said received reflected light beam in said light receiving means, and
- filter means coupled to an output of said amplifier means for removing unnecessary signals so as to allow the amplified signal, with said unnecessary signals removed therefrom, to be introduced into said calculating circuit.

11. The optical distance measuring apparatus as claimed in claim 4, wherein said calculating circuit includes:
- a local oscillator,
- a mixer, and
- calculator means for calculating a number of signals outputted from said mixer so as to determine a distance from said object to be measured while a phase difference between said distance measuring light beam and said received reflected light beam is corrected,
- an output from said reference oscillator, an output from said local oscillator and the amplified signal derived from said received reflected light beam being introduced into said calculator means.

* * * * *

UNITED STATES PATENT AND TRADEMARK OFFICE
CERTIFICATE OF CORRECTION

PATENT NO. : 5,317,375
DATED : May 31, 1994
INVENTOR(S) : Ohmamyuda et al.

It is certified that error appears in the above-indentified patent and that said Letters Patent is hereby corrected as shown below:

Title page, Item [19] and [75] Inventor, change:

"Omamyuda" to --Ohmamyuda--

Signed and Sealed this

Tenth Day of September, 1996

Attest:

BRUCE LEHMAN

Attesting Officer

Commissioner of Patents and Trademarks